United States Patent
Sangle-Ferriere

(10) Patent No.: US 12,301,549 B2
(45) Date of Patent: May 13, 2025

(54) CRYPTOGRAPHIC METHOD FOR VERIFYING DATA

(71) Applicant: Bruno Sangle-Ferriere, Paris (FR)

(72) Inventor: Bruno Sangle-Ferriere, Paris (FR)

( * ) Notice: Subject to any disclaimer, the term of this patent is extended or adjusted under 35 U.S.C. 154(b) by 34 days.

(21) Appl. No.: 18/072,962

(22) Filed: Dec. 1, 2022

(65) Prior Publication Data

US 2024/0089240 A1 Mar. 14, 2024

Related U.S. Application Data

(63) Continuation-in-part of application No. 16/934,376, filed on Jul. 21, 2020, now Pat. No. 11,956,367, which is a continuation-in-part of application No. 16/793,123, filed on Feb. 18, 2020, now Pat. No. 11,914,754.

(30) Foreign Application Priority Data

Feb. 19, 2019 (FR) ........................................ 1901648

(51) Int. Cl.
H04L 29/06 (2006.01)
H04L 9/40 (2022.01)

(52) U.S. Cl.
CPC ................................ H04L 63/0428 (2013.01)

(58) Field of Classification Search
None
See application file for complete search history.

(56) References Cited

U.S. PATENT DOCUMENTS

| | | | | |
|---|---|---|---|---|
| 6,104,811 A | * | 8/2000 | Aiello | H04L 9/0662 380/46 |
| 9,565,022 B1 | * | 2/2017 | Robshaw | H04L 9/14 |
| 10,193,695 B1 | * | 1/2019 | Endress | H04L 9/3236 |
| 10,362,169 B1 | * | 7/2019 | Sanderlin | H04M 3/493 |
| 10,891,366 B1 | * | 1/2021 | Wu | H04L 9/0866 |

(Continued)

FOREIGN PATENT DOCUMENTS

| | | |
|---|---|---|
| CN | 101547184 A | 9/2009 |
| EP | 1421548 A1 | 5/2004 |

(Continued)

OTHER PUBLICATIONS

Foreign Examination Report dated Mar. 8, 2023 in connection with Indian Application No. 202127035375, 7 pages.

(Continued)

*Primary Examiner* — Bryan F Wright
*Assistant Examiner* — Hassan A Hussein
(74) *Attorney, Agent, or Firm* — Baker & McKenzie LLP

(57) ABSTRACT

A method, implemented by at least one apparatus, for comparing a first dataset and a second dataset, in particular with a view to determining whether these two datasets are identical. This method not requiring the presence of these two datasets in the apparatus, and including the following steps a) mixing a number, called the mixer number, with the first dataset, using a mixing function, in order to obtain mixed data, b) hashing the mixed data using a hash function, and c) comparing the hash thus obtained in step b) with a third dataset assumed to be the hash of the second dataset mixed with the same mixer number as that used in step a) and with the same mixing function.

19 Claims, 5 Drawing Sheets

(56) References Cited

U.S. PATENT DOCUMENTS

| | | | |
|---|---|---|---|
| 11,893,115 B2 | 2/2024 | Järvinen et al. | |
| 2011/0116096 A1* | 5/2011 | Welch | G01B 9/02 356/450 |
| 2011/0246433 A1* | 10/2011 | Sun | G06F 16/10 707/698 |
| 2012/0057702 A1* | 3/2012 | Minematsu | H04L 9/3242 380/255 |
| 2012/0143765 A1* | 6/2012 | Yamaguchi | G06F 21/10 705/52 |
| 2014/0298038 A1* | 10/2014 | Gauravaram | H04L 9/0643 713/189 |
| 2014/0351593 A1* | 11/2014 | Anson | H04L 63/0428 713/168 |
| 2014/0364098 A1* | 12/2014 | Ueno | H04M 1/0202 455/566 |
| 2015/0261502 A1* | 9/2015 | Sartor | G06F 7/588 359/107 |
| 2017/0091485 A1* | 3/2017 | Yuen | H04L 9/002 |
| 2018/0060560 A1* | 3/2018 | Waltermann | H04L 9/3226 |
| 2018/0068127 A1* | 3/2018 | Hamano | G06F 21/10 |
| 2018/0176011 A1* | 6/2018 | Hars | H04L 9/0861 |
| 2018/0241548 A1* | 8/2018 | Dolev | H04L 9/0656 |
| 2018/0248686 A1* | 8/2018 | Alakuijala | H04L 9/0643 |
| 2018/0248687 A1* | 8/2018 | Wassenberg | G06F 9/3887 |
| 2018/0324152 A1* | 11/2018 | Jarchafjian | H04W 12/63 |
| 2018/0367540 A1* | 12/2018 | Miranda | H04L 63/0478 |
| 2019/0080189 A1* | 3/2019 | Van Os | H04N 23/62 |
| 2019/0102782 A1* | 4/2019 | Diehl | G06F 21/16 |
| 2019/0104121 A1* | 4/2019 | Khandani | H04L 9/0891 |
| 2019/0109715 A1* | 4/2019 | Hars | H04L 9/0637 |
| 2019/0204403 A1* | 7/2019 | Booij | G01S 1/72 |
| 2020/0034050 A1* | 1/2020 | Brasfield | G06F 12/084 |
| 2020/0068244 A1* | 2/2020 | Hunacek | H04N 21/4181 |
| 2020/0110905 A1* | 4/2020 | O'Cleirigh | G06F 21/51 |
| 2020/0226952 A1* | 7/2020 | Lightowler | H04L 9/0637 |
| 2020/0236092 A1* | 7/2020 | von Vistauxx | H04L 9/40 |
| 2020/0351100 A1* | 11/2020 | Sangle-Ferriere | G06F 21/64 |
| 2021/0165914 A1 | 6/2021 | Sangle-Ferriere | |
| 2021/0382817 A1* | 12/2021 | Tajima | G06F 11/3688 |
| 2022/0012338 A1 | 1/2022 | Järvinen et al. | |
| 2022/0085984 A1* | 3/2022 | Khandani | H04L 9/0822 |
| 2023/0094612 A1* | 3/2023 | Chen | G06N 10/00 |
| 2023/0217210 A1* | 7/2023 | Russell | H04W 4/023 455/456.1 |

FOREIGN PATENT DOCUMENTS

| | | |
|---|---|---|
| WO | 03/007228 A1 | 1/2003 |
| WO | 2020099718 A1 | 5/2020 |

OTHER PUBLICATIONS

International Search Report and Written Opinion dated Apr. 21, 2020 in connection with International Application No. PCT/EP2020/054126, 10 pages.

USPTO Patent Center Documents for U.S. Appl. No. 16/934,376 on Mar. 1, 2023.

USPTO Patent Center Documents for U.S. Appl. No. 16/793,123 on Mar. 1, 2023.

Office Action issued in U.S. Appl. No. 16/793,123, Jan. 1, 2023.

Office Action issued in U.S. Appl. No. 16/793,123, Jul. 26, 2022.

Office Action issued in U.S. Appl. No. 16/793,123, Mar. 31, 2022.

Office Action issued in U.S. Appl. No. 16/793,123, Oct. 19, 2021.

Office Action issued in U.S. Appl. No. 16/934,376, May 25, 2022.

Preliminary Search Report for FR 1901648 mailed Nov. 14, 2019 (2 pages).

Final Rejection for U.S. Appl. No. 16/934,376, mailed Dec. 9, 2022 (69 pages).

* cited by examiner

[Fig. 1]
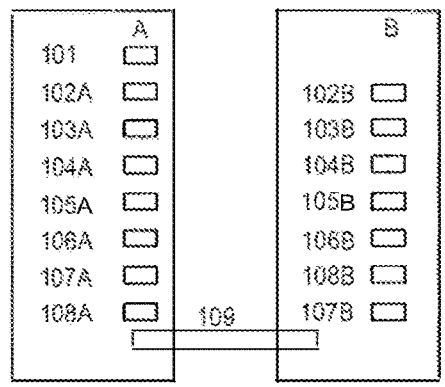
[Fig. 2]
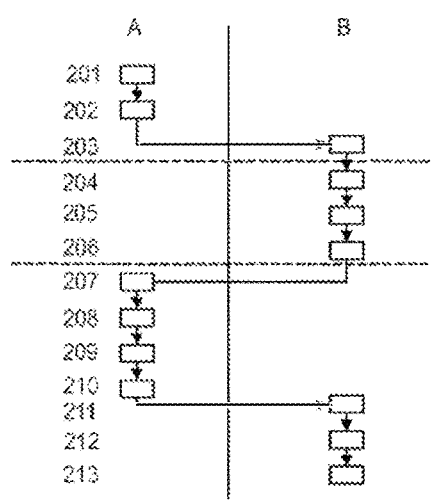
[Fig. 3]
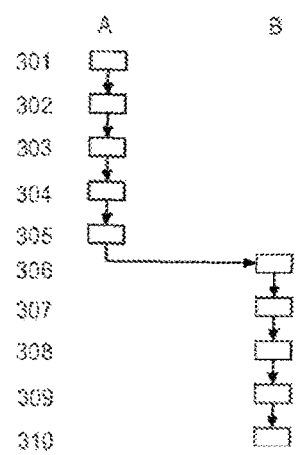

[Fig. 4]
[Fig. 5]
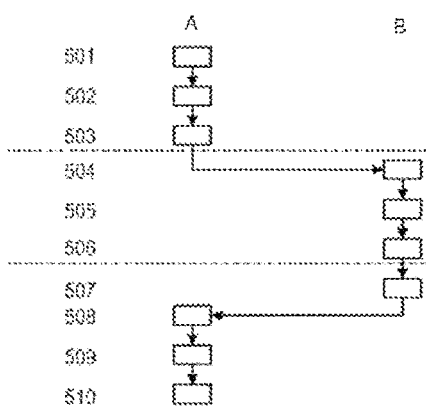
[Fig. 6]
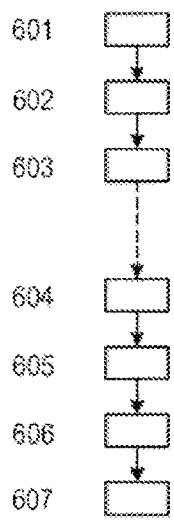

[Fig. 7]
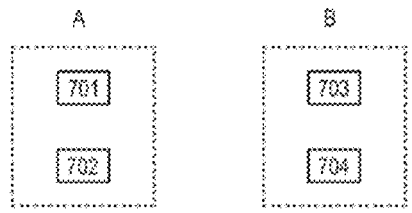
[Fig. 8]
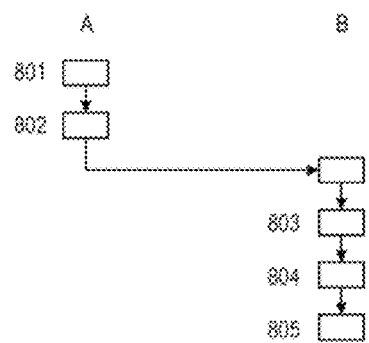
[Fig. 9]
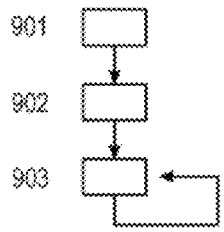
[Fig. 10]
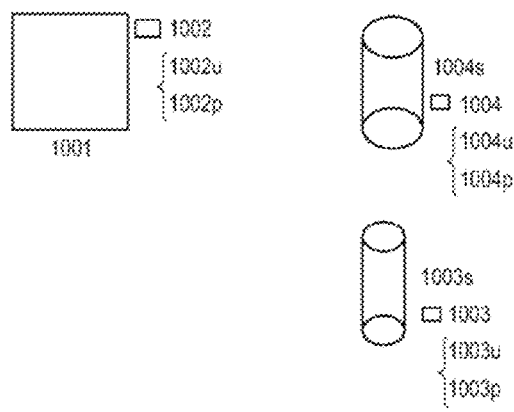

[Fig. 11]
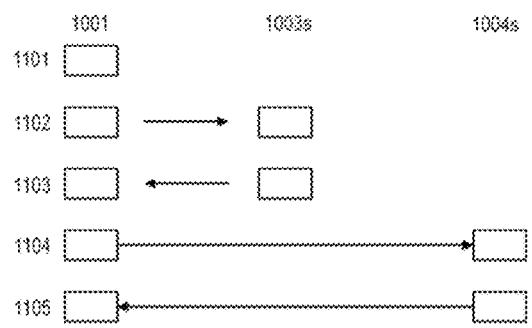
[Fig. 12]
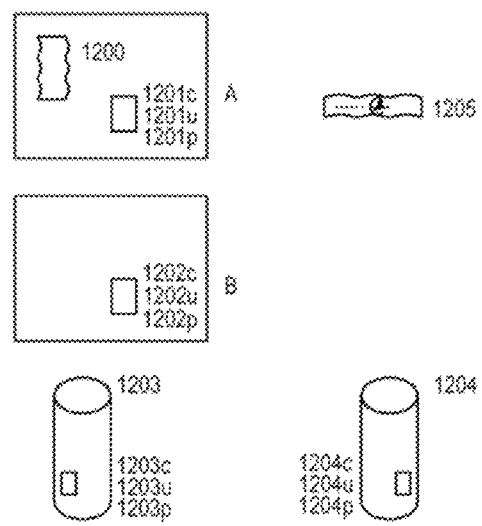
[Fig. 13]
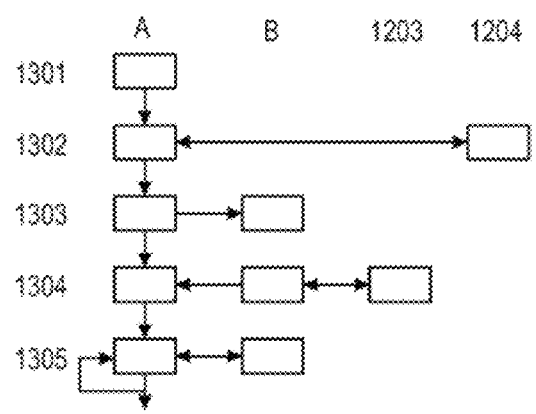

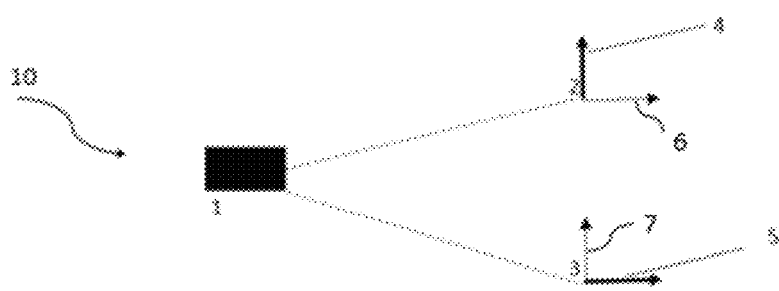
[Fig. 14A]
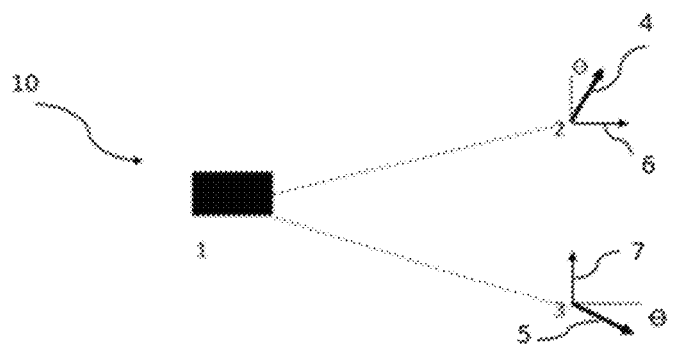
[Fig.14B]

CRYPTOGRAPHIC METHOD FOR VERIFYING DATA

CROSS-REFERENCE TO RELATED APPLICATIONS

This application is a continuation-in-part of U.S. patent application Ser. No. 16/934,376, filed on Jul. 21, 2020, now U.S. Pat. No. 11,956,367, issued on Apr. 9, 2024, which is a continuation-in-part of U.S. patent application Ser. No. 16/793,123, filed on Feb. 18, 2020, now U.S. Pat. No. 11,914,754, issued on Feb. 27, 2024, which claims priority to French Patent Application No. 1901648, filed on Feb. 19, 2019, each of which is incorporated herein by reference in their entirety for all purposes. U.S. patent application Ser. No. 16/793,123 contains a certified copy of French Patent Application No. 1901648.

TECHNICAL FIELD

The present invention relates to digital cryptography and to the security of computational and electronic devices, and in particular to digital signatures.

BACKGROUND

Computers and electronic apparatuses are often connected to a network, physically, wirelessly, by RFID, or by any other secure or unsecure means, and sometimes need to know the identity of the apparatus that has sent them certain data, for example in order to ensure that these data have not been transmitted by another apparatus, which intercepted them and modified them before sending them on to the legitimate recipient, or quite simply to identify beyond a shadow of a doubt the identity of the sender of the data, which is for example an automobile on a road network or an RFID tag worn by a competitor during a sporting event, or a list of bits randomly generated by a Quantum Key generation Device (QKD), or for any other reason why the identity of the sender of the data is important to the recipient.

Quantum Key generation devices often use electronic signatures exchanged between two remote parties receiving a randomly generated key to make sure that the received key is the same for each party. However, progress in quantum computing and/or cryptography may make it possible to retrieve the keys used for the electronic signing of received keys thereby allowing the supposedly secret key to be shared between a legitimate and a non-legitimate device without the legitimate device noticing it.

The transmitted data may be sent entirely encrypted with a key attributed to the sender. However, the encryption of all of the data makes the use of single-use keys (one-time pads) difficult. Specifically, the encryption of all of the data is a method that uses keys that are as long as the data that they encrypt, and these keys must be renewed after use.

It is therefore necessary for computers or other electronic devices entering into communication, for example via the exchange of text, identifiers, numbers, computer programs, images or video or audio codes, to verify the identity of the sending device using the encryption of an amount of data smaller than the amount of data sent. It is for this reason that an electronic signature consisting in encrypting a hash of the data is used. The term "hash" is used to refer to the result of a hash function that, on the basis of an initial datum provided as input, computes a fingerprint that serves to rapidly, though incompletely, identify the initial datum. It is common to send, with the data, an encrypted hash that will then be decrypted by the recipient, then compared to the hash of the received data. MD5, SHA1 and SHA256 are algorithms conventionally used for such hashing operations. However, data hashes are generally much smaller in size than the original data, and it may be possible to create other data, similar but slightly different to the original data, having a hash equal to the hash of the original data. These data could therefore be substituted for the original data, without being rejected by the procedure for verifying the hash. Any type of data may be substituted, but the detectability by the user of the substitution decreases as the complexity of the data increases (a long text, an audio file, a photo or a video). To make the substitution, it is not even necessary to decrypt the encrypted hash. It is enough to simply compute the hash of the original data. Furthermore, hash functions such as MD5 and SHA1 are hash functions that are at the present time relatively easy to bypass.

The quantum computers that are in the process of being developed should soon be capable of bypassing the security provided by hash functions, since they are capable of optimizing the start files so that they have a preset hash.

Methods for improving the security of systems using hashing techniques are known in the prior art.

Patent application CN101547184 uses a plurality of auxiliary authentication values that are exchanged between a server and users.

In the method proposed in patent application US2011/0246433, a hash of the data to be sent is generated and concatenated with the data chunk to be sent and a random number tag.

Patent application EP 1 421 548 describes a method for transmitting information, in which a message to be sent is concatenated with a random number then hashed. The result of the hashing is sent unencrypted to the other party. The message is sometimes transmitted as such or encrypted. The random number is always transmitted signed, and optionally encrypted, to the other party. The fact of not encrypting the hash when the message is itself not encrypted makes the transmission vulnerable to very powerful or quantum computers that are able to compute random numbers compatible with the unencrypted message and the result of the hash. Moreover, encrypting the entire message has the drawback, if such an encryption uses one-time pads, which are supposed to be uncrackable, of requiring both the two corresponding parties to have access to such shared keys.

SUMMARY

There is a need to further improve the security of hashing techniques, decreasing the probability of error in the verification of data, and, where appropriate, allowing a more reliable authentication of the sender of these data.

The invention in particular aims to meet this need, and it achieves this aim by virtue of a method, implemented by a least one apparatus, for comparing a first dataset and second dataset, in particular with a view to determining whether these two datasets are identical, this method comprising the following steps:

a) mixing a number, called the mixer number, with the first dataset, using a mixing function, in order to obtain mixed data, b) hashing the mixed data using a hash function, and c) comparing the hash thus obtained in step b) with a third dataset assumed to be the hash of the second dataset mixed with the same mixer number as that used in step a) and with the same mixing function.

By virtue of the invention, and in particular of the mixing of the first dataset with a mixer number prior to the hashing, it becomes very improbable to be able to create data similar to this first dataset that, after having been mixed with the same mixing number, will have the same hash is the mixed first dataset.

Preferably, the method according to the invention does not require two datasets to be simultaneously present in the apparatus.

Preferably, the mixer number is generated randomly.

The mixer number is preferably generated by the apparatus. As a variant, the mixer number is generated by another trusted apparatus.

The generation of the mixer number may be based on a pair of input values that are physical quantities at least one of which varies continuously, such as for example the temperature and the time, or on a quantum phenomenon. For example, such a generation may be based on which of two Young's slits a photon chooses to use to pass through a plate.

Preferably, the mixing operation in step a) is carried out by the apparatus. As a variant, the mixing is carried out by another trusted apparatus.

The mixing function combines the first dataset and the mixer number. It is, preferably, an XOR logic function that adds the bits of the first dataset and those of the mixer number, one by one. Since the size of the mixer number is generally smaller than the size of the first dataset, it is possible to add via an XOR the bits of the mixer number to the first or last bits of the first dataset.

The mixer number may have the same size as the first dataset. In this case, the addition via the XOR function is carried out on all the bits, one by one.

Alternatively, the mixing function is a suffix function consisting in adding the mixer number to the end of the first dataset.

The mixing function may even be an encrypting function using the mixer number as encryption key to encrypt the first dataset.

In one embodiment, the mixing function is a combination of an XOR function, a suffix function consisting in adding the mixer number to the end of the first dataset and an encryption function using the mixer number as encryption key to encrypt the first dataset.

Preferably, the data in step b) are hashed by the apparatus. As a variant, the hashing is carried out by another trusted apparatus.

Preferably, the hash function is chosen among SHA1, SHA2, SHA256 and MD5 and the Jenkins function.

A first variant of the method according to the invention is a method for verifying with the apparatus the integrity of a message originating from a sender, the method comprising:
i. the apparatus receiving the message and an identifier of the message, said message forming the first dataset,
ii. generating the mixer number,
iii. implementing steps a) and b), in which the message is mixed with the mixer number then hashed,
iv. optionally encrypting the mixer number,
v. the apparatus sending the identifier of the message and the optionally encrypted mixer number to the sender of the message,
vi. the apparatus receiving the encrypted third dataset, preferably with the identifier of the message, originating from the sender,
vii. decrypting the third dataset, and
viii. implementing step c), the integrity of the message being ensured if the third dataset decrypted in step vii and the hash obtained in step b) are identical.

By "integrity" of the message, what must be understood is its non-alteration, for example by a malicious third-party that intercepted it during its transmission.

The identifier of the message may be a sequence of alphanumeric characters and/or signs able to be converted into a digital word via an ASCII code inter alia.

The identifier of the message may contain the identifier of the sender and an order number of the message.

The authentication of the sender is in particular ensured by the decrypting operation in step vii.

The decryption may be performed with an encryption key kept secret between the apparatus and the sender.

Preferably the mixer number is kept secret and a renewable key of the size of the hash (third dataset) is used, especially with an XOR as an encryption function.

Alternatively, the mixer number is kept secret and a non-renewed symmetric key is used with a symmetric encryption function.

Alternatively, the mixer number is kept secret and a non-renewed asymmetric key pair is used with an asymmetric encryption function.

Alternatively, the mixer number is kept secret and a non-renewed symmetric key is used with a symmetric encryption function.

Alternatively, the mixer number is a renewable key and another renewable key of the size of the hash (third dataset) is used, especially with an XOR as an encryption function.

Alternatively, the mixer number is a renewable key and a non-renewable key of the size of the hash (third dataset) is used, especially with an XOR as an encryption function.

Alternatively, the mixer number is a renewable key and, a non-renewed symmetric key is used with a symmetric encryption function.

Alternatively, the mixer number is a renewable key and, a non-renewed asymmetric key is used with an asymmetric encryption function.

Preferably, the mixer number identifier is exchanged between the sender and the apparatus, which are each able to find the corresponding mixer number in a memorized list of mixer numbers.

In another embodiment, the mixer number is generated randomly after each use. Such mixer number may be encrypted by a one-time key. Alternatively, the mixer number is encrypted by a symmetric or an asymmetric function.

This first variant of the invention makes it possible to ensure both the integrity of the received message and of the identity of the sender of the message.

The steps relating to sending and receiving the data may be carried out using the same communication protocol or using different communication protocols. For example, the data received in step i are received via Wi-Fi, the data sent in step v are sent via 4G and the data received in step vi are received via WiMAX.

In step i, the apparatus may also receive an identifier of the sender. This identifier is useful if the apparatus is able to receive messages from various senders, such an identifier allowing it to choose the encryption keys to be used to encrypt or decrypt the information exchanged with the sender during the encrypting and decrypting operations described in this first variant of the invention.

Preferably, the method according to this first variant comprises, between steps v and vi:
the sender receiving the identifier of the message and the optionally encrypted mixer number,
optionally decrypting the mixer number,
identifying, using the identifier of the message, the message sent to the apparatus, mixing the message with the optionally decrypted mixer number using the mixing function, hashing the data resulting from the preceding step using the hash function, encrypting the hash resulting from the preceding step, and sending to the apparatus the encrypted hash preferably with the identifier of the message.

The optional encryption of the mixer number in step iv is preferably carried out by the apparatus.

The optional encryption of the mixer number makes it possible to prevent this number from being intercepted and altered by a malicious third-party.

Preferably, the optional encryption of the mixer number is carried out using a single-use key of a size at least equal to that of the number. Since the key is single-use, a new key is used each time a mixer number is sent.

The encryption may also be carried out using a symmetric key. The symmetric encryption key is kept secret between the sender and the apparatus and is preferably renewed after a certain number of transmissions.

Alternatively, the optional encryption of the mixer number is asymmetric, being carried out either using a public key of the sender known to the apparatus, so as to allow the decryption by the sender using its associated private key, or using a private key of the apparatus the public key of which is known to the sender.

Thus, a third party is prevented from learning or altering the mixer number.

Preferably, the decryption in step vii is carried out by the apparatus.

The decryption in step vii may be carried out using a symmetric key, if the encryption in step iv is carried out using a single-use key.

Alternatively, the decryption in step vii is carried out using a single-use key, if the encryption in step iv is carried out using a symmetric key.

The decryption in step vii may also be carried out using other methods, for example using a public key known to the apparatus, associated with a private key of the sender having served to encrypt the hash received in step vi. Thus, the apparatus is capable of certifying the identity of the sender.

The mixer number may have the same size as the symmetric key that serves to encrypt it, if such a symmetric key is used, and also the same size as the hash.

Preferably, the private, symmetric and single-use encryption keys and the mixer numbers are unguessable and unobservable by third-party devices, to prevent listening to the data sent by the sender or the apparatus from making it possible to generate and transmit fraudulent second datasets that would cause the integrity of messages received by the apparatus but transmitted by a sender other than that legitimately supposed to hold said keys to be wrongly recognized.

If the encryption key X of the mixer number x is known, then the hash of the mixed message may be known, because it is enough to decrypt the encryption of x and to compute the mixture of the message before hashing it. The key Y encrypting the hash may then also be guessed or known to belong to a small universe, the hash of the mixed message and its encryption with Y both being known or observable. The encryption key Y is therefore a function F of the encryption key X, or else the encryption key Y belongs to a universe depending on the encryption key X. The observation of a plurality of transmissions causes a plurality of functions F to appear, and the values of the keys X and Y are at the intersection of these functions. It is preferable to avoid this situation. It is therefore recommended either to use, for the key X or the key Y, values that change over the course of the transmissions, or to use encrypting functions such that, for each observation of exchanges of the triplet "message, encrypted number, encrypted hash", the universe of the keys Y for each possible X is large; this making the universe resulting from the intersection of these universes deducible at each observation large. It is not recommended to take, for the key Y, the randomly generated mixer number x. Specifically, if the mixer number x is used as encryption key Y, or indeed if the key Y is computed depending on the mixer number x using a defined formula, knowing the encrypted value C of the mixer number x encrypted with the key X, the mixer number x, and therefore Y, becomes another function G of the key X; and the keys X and Y would be at the intersection of the function F and of this new function G. Preferably, the key X or the key Y is renewed after each exchange.

The apparatus may furthermore comprise a counter of consecutive failed verification attempts that triggers a blockage thereof when a defined number is reached, the apparatus possibly being unblocked during the renewal of the encryption key used to encrypt the mixer number or the encryption key used to encrypt the hash.

Alternatively, the apparatus may impose a predetermined number of unsuccessful successive verification attempts of messages arriving or sent by a same sender, after which predetermined number, and after a set period of time, the apparatus either places the received messages or the message sent by the same sender in a queue or, preferably, ignores them, before again either trying to decrypt the messages placed in the queue or trying to resume decrypting the messages that are still arriving after the expiry of the set period of time. This approach is advantageously implemented by a device sending back to the sender of the messages placed in a queue or ignored, a reply message to inform it about the treatment of its message. For instance, three messages received consecutively from a sender that cannot be verified may cause the device to discard messages sent by the same sender for a minute, after having told the said sender that its messages are being ignored for such time.

A second variant of the method according to the invention is a method for verifying with the apparatus the integrity of a message originating from a sender, the method comprising:

i. the apparatus receiving the message, the encrypted third dataset and the encrypted mixer number, ii. decrypting the mixer number and the third dataset, and iii. implementing steps a) to c), the integrity of the message being ensured if the hash obtained in step b) and the third dataset decrypted in step ii are identical.

The decryption may be performed with an encryption key kept secret between the apparatus and the sender.

Preferably, the mixer number is kept secret and a renewable key of the size of the hash (third dataset) is used, especially with an XOR as an encryption function.

Alternatively, the mixer number is kept secret and a non-renewed symmetric key is used with a symmetric encryption function.

Alternatively, the mixer number is kept secret and a non-renewed asymmetric key pair is used with an asymmetric encryption function.

Alternatively, the mixer number is kept secret and a non-renewed symmetric key is used with a symmetric encryption function.

Alternatively, the mixer number is a renewable key and another renewable key of the size of the hash (third dataset) is used, especially with an XOR as an encryption function.

Alternatively, the mixer number is a renewable key and a non-renewable key of the size of the hash (third dataset) is used, especially with an XOR as an encryption function.

Alternatively, the mixer number is a renewable key and, a non-renewed symmetric key is used with a symmetric encryption function.

Alternatively, the mixer number is a renewable key and, a non-renewed asymmetric key is used with an asymmetric encryption function.

Preferably, the mixer number identifier is exchanged between the sender and the apparatus, which are each able to find the corresponding mixer number in a memorized list of mixer numbers.

In another embodiment, the mixer number is generated randomly after each use. Such mixer number may be encrypted by a one-time key. Alternatively, the mixer number is encrypted by a symmetric or an asymmetric function. Preferably, the method according to this second variant of the invention comprises, before step i:

the sender generating the mixer number,
mixing the mixer number with the message, using the mixing function,
hashing the data resulting from the preceding step using the hash function,
encrypting the hash resulting from the preceding step and forming the third dataset,
encrypting the mixer number, and
sending, to the apparatus, the message, the encrypted third dataset and the encrypted mixer number.

These steps are carried out by the genuine sender and allow the alteration of the message by an unauthorized third party to be detected.

The decryption in step ii of the mixer number and of the third dataset is preferably carried out by the apparatus.

Preferably, the encryption of the mixer number is carried out using a single-use key, and the encryption of the third dataset is carried out using a symmetric key, the symmetric key preferably being renewed occasionally.

Alternatively, the encryption of the mixer number is carried out using a symmetric key, and the encryption of the third dataset is carried out using a single-use key, the symmetric key preferably being renewed occasionally.

The encryption of the mixer number and the encryption of the third dataset may also be of the same type, or of different types, these types of encryption possibly employing symmetric keys, or asymmetric keys.

If a pair of asymmetric keys is used for the encryption of the mixer number, the private key of said pair is preferably kept by the apparatus, the corresponding public key then being known to the sender.

The encryption of the third dataset may be carried out using a private key kept by the sender, the corresponding public key then being known to the apparatus.

Thus, by decrypting the mixer number and the third dataset, the apparatus is capable of certifying the identity of the sender.

The encryption of the mixer number and that of the third dataset may be carried out using the same encrypting function, in particular when the encryption of the mixer number is asymmetric.

Alternatively, the encryption of the mixer number and that of the third dataset are carried out by two different encrypting functions.

Preferably, the types of encrypting functions to be used form part of the configuration of the sender and of the apparatus, prior to the setup of the communication between the latter two. A third variant of the method according to the invention is a method in which the first dataset is present in the apparatus and the second dataset is present in a second apparatus, the method comprising:

i. implementing steps a) and b),
ii. encrypting the mixer number,
iii. the apparatus sending, to the second apparatus, the encrypted mixer number,
iv. the apparatus receiving an encrypted hash of the second dataset,
v. decrypting the encrypted hash, and
vi. implementing step c).

The decryption may be performed with an encryption key kept secret between the apparatus and the sender.

Preferably, the mixer number is kept secret and a renewable key of the size of the hash is used, especially with an XOR as an encryption function.

Alternatively, the mixer number is kept secret and a non-renewed symmetric key is used with a symmetric encryption function.

Alternatively, the mixer number is kept secret and a non-renewed asymmetric key pair is used with an asymmetric encryption function.

Alternatively, the mixer number is kept secret and a non-renewed symmetric key is used with a symmetric encryption function.

Alternatively, the mixer number is a renewable key and another renewable key of the size of the hash is used, especially with an XOR as an encryption function.

Alternatively, the mixer number is a renewable key and a non-renewable key of the size of the hash is used, especially with an XOR as an encryption function.

Alternatively, the mixer number is a renewable key and, a non-renewed symmetric key is used with a symmetric encryption function.

Alternatively, the mixer number is a renewable key and, a non-renewed asymmetric key is used with an asymmetric encryption function.

Preferably, the mixer number identifier is exchanged between the sender and the apparatus, which are each able to find the corresponding mixer number in a memorized list of mixer numbers.

In another embodiment, the mixer number is generated randomly after each use. Such mixer number may be encrypted by a one-time key. Alternatively, the mixer number is encrypted by a symmetric or an asymmetric function. Preferably, the method according to this third variant of the invention comprises, between steps iii and iv:

the second apparatus receiving the encrypted mixer number,
decrypting the mixer number,
creating a modified copy of the second dataset using the mixer number and the mixing function,
hashing the modified copy of the second dataset using the hash function,
encrypting the hash resulting from the preceding step and forming the third dataset, and
the second apparatus sending, to the apparatus, the encrypted hash of the second dataset.

The encryption of the mixer number in step ii and the decryption of the encrypted hash in step v are preferably carried out by the apparatus.

Preferably, the encryption of the mixer number is carried out using a symmetric encryption key shared with the second apparatus.

The encryption of the hash may be carried out using a single-use key and the encryption of the mixer number may be carried out using a symmetric key that is renewed occasionally.

Alternatively, the encryption of the mixer number is carried out using a single-use key and the encryption of the hash is carried out using a symmetric key that is renewed occasionally.

The encryption of the mixer number and the encryption of the hash may also be of the same type, or of different types, these types of encryption possibly employing symmetric keys, in particular single-use keys, or asymmetric keys.

The invention may be used in quantum communication methods, especially in Quantum Key Distribution E91 where a pair of entangled photons is used to generate a shared secret between two photon receivers.

Another aspect of the invention is a shared quantum key generation method using a quantum communication system, the system comprising:
- an emitter of entangled photons, configured to generate at least one pair of entangled photons comprising a first photon emitted on a first propagation path and simultaneously a second photon emitted on a second propagation path different from the first propagation path;
- a first receiver arranged on the first propagation path, comprising a first polarization measurement base configured to measure a polarization state of a photon received by the first receiver; and
- a second receiver arranged on the second propagation path, comprising a second polarization measurement base configured to measure a polarization state of a photon received by the second receiver, the clocks of the two receivers being synchronized so that two photons of a same photon pair arriving at the receivers arrive at the same time according to the clocks of the reached receivers;
- wherein the first receiver establishes a first list comprising the reception dates and a second list comprising these reception dates and the polarization states of the photons received by the first receiver, and the second receiver establishes a third list comprising the reception dates and a fourth list comprising these reception dates and the complementary polarization states of the photons received by the second receiver;
- wherein the first list and/or the third list are exchanged between the first receiver and the second receiver, and are preferably signed electronically;
- wherein upon reception of the third and/or first lists, respectively, the first receiver and/or the second receiver establish(es) a fifth list comprising the dates at which the two photons of the same pairs were received at both receivers, as some photons may have been lost during the transmission between the emitter and one or the two receivers;
- wherein if only one of the two receivers establishes the fifth list, the said fifth list is transmitted, preferably electronically signed, to the other receiver, so that the first receiver and the second receiver establish respectively a sixth list and a seventh list of polarization states of the photons as received by the first receiver, the sixth list being derived from the second list and the fifth list, the seventh list being derived from the fourth list and the fifth list, each polarization state on the sixth list of a photon received at a time marked on the fifth list being the same polarization state of the corresponding photon received at the same time and marked on the second list, each polarization state on the seventh list of a photon received at a time marked on the fifth list being the complementary polarization state of the corresponding photon received at the same time and marked on the fourth list;
- wherein respective signatures of the sixth list and the seventh list are exchanged between the first and the second receivers, according to the method of the invention, preferably with a mixer number renewed each time and a renewed one-time key used for the hash encryption;
- wherein the said sixth and seventh lists can be used as a shared list of random bits. From this shared list, one-time keys or lists of random rotation angles of the polarization measurement bases, for instance, can be extracted.

A signed message may be exchanged between the two receivers before the sixth and seventh lists are used as one-time keys.

The polarization measurement bases may be rotated randomly and simultaneously by a same angle kept secret between the two receivers.

The sixth and seventh lists may be used as lists of random rotation angles of the polarization measurement bases.

The photons are preferably sent in a set polarization that is not the polarization of the photons that can be measured by the receivers, for instance the photons may be sent circularly polarized, while being detected in orthogonally linearly polarized states, or sent linearly polarized in a direction that is not the direction of the polarization in which they may be detected, preferably set at 45° to the linear polarization direction in which the photons polarizations are detected by the receivers.

The direction of the polarization angle at which the polarizations are detected by the receivers, may be changed periodically and randomly by the same angle at both receivers, the change being preferably a change of 0° or 45° and, preferably the linear polarization angle at the emitter being changed by the same angle if the emitter does emit the photons linearly polarized. The change may occur for instance every millisecond. This would avoid a spying device from sending pairs of photons to both receivers in known polarizations that can be detected by the receivers, one of the photons being in the complementary polarization of the other and arriving at the same time at the receivers according to the 'synchronized' clocks, as the direction at which the photons may be detected by the receivers may not be known by the spying device.

The angle of the polarization may be changed, for instance by the use of a by-circuit for the photons ahead of the receivers whereby a first switch may divert the incoming photon to a photon polarization rotating device and a second switch allows to send the photon exiting the said polarization rotating device towards the said receiver, so that in a first mode the photons bypasses the polarization rotating device while in another mode the photons go through the polarization rotating device before entering the receivers. The photon rotating devive may be made for instance of a chiral material such as 1.4 to 2.4 ηm CdsE nanoparticules (source inorganic Nanostructures with Strong Chiroptical Activity Anastasia Visheratina & Nicholas A. Kotov* University of Michigan), or such as a device made of a first birefringent prism separating the light into two beams of linearly polarized light which each go through two quarterly wave plates set an angle between them so that light leaves the second quarter wave plate linearly polarized at an angle to the polarization direction at which it enters the first quarter wave plate, the two beams of linearly polarized light leaving the second quarter wave plates being joined into a single beam by going through a second birefringent prism.

The angle changes may be set accordingly to single use keys shared between the two receivers and, if necessary, the sender. If the angle change is applied only to the two receivers, for instance if the sender sends the photons in a circularly polarized state while the readers read the photons in a linearly polarized state, the single use key may be renewed using keys generated by the here described shared quantum key generation process.

By "complementary polarization state of a given photon", it is meant the polarization state in which the photon entangled to the said given photon should be.

Moreover, the photon path is preferably physically protected against the insertion of a spying device in a first zone, in its part where the photons travel not entangled. For instance, if the photon path is longer by a measured length between the photon emitter and the second photon receiver, than between the emitter and the first photon receiver, the path taken by the photon between the emitter and the second receiver is physically monitored at least close to the second receiver for the said measured length.

The said measured length can be, for instance, measured physically, especially if the photons travel in optical fibers. Also, and particularly when travelling through free space, the measure can be done, for instance, having placed really synchronized clocks on the two receivers (as opposed to the synchronized clocks described above), and having checked at the time of such measurement that no spying device has been inserted between the emitter and the receivers.

Moreover again, the photon path is preferably physically protected in a second zone ahead of the first zone if any or ahead of the detector if there is no first zone, against the insertion of a spying device. This second zone is configured so that the photon travels in it during more time than the time arrival uncertainty at which photons are detected at both receptors.

If a spy photon detector and emitter is introduced ahead of the first detector, such spy detector will detect photons and their polarization before remitting photons in the same polarization to the second detector. However, such re-emitted photon will need to travel through the first zone and the second zone thereby arriving at time different than the time it would have arrived should no spying device have interfered, and such time difference being noticeable by the second receiver.

A spy emitter may send a first photon entangled to a second photon to the legitimate first receptor and detect the polarization state of the first entangled photon by looking at the polarization of the second photon. However, in order to transmit such polarization state to the second emitter, it will need to send a polarized photon in the proper state but such photon will need to travel first to the protected second zone than through the protected zone, taking more time and therefore arriving at a time different than the time the initial spy photon was detected by the first receiver.

If on the other hand, a spy device sends a first photon entangled to a second photon to the second receiver and detects its polarization state it could then send to the first receiver a photon in the same polarization; however this photon will arrive after the second receiver has received its detected photon therefore at a time, according to the 'synchronized' clocks different from the time when the other photon arrived at the second receiver.

The sizes of the first and third lists are preferably chosen with a tolerance coefficient so that the sixth and seventh lists have reasonable chance, for instance at least 50% chance of being equal, should nothing has interfered in the entangled photon transmission process. If, for instance, entangled photons are read in corresponding states at both receivers in 99.9% of the cases, i.e. if the reading of their polarization state is correct in 99.9% of cases, the sixth and seventh lists may be 500 bits long and the first and second lists may comprise 5000 successive reception times if 90% of the entangled photons are lost between the photon emitter and the receivers, each photon receiver at any receiver having only a 10% chance that its entangled photon has been received by the other receiver.

A fourth variant of the method according to the invention is a method for verifying that a dataset present in the apparatus has not been modified between two times d1 and d2, this dataset forming, at the time d1, the first dataset and, at the time d2, the second dataset, the method comprising:
  i. implementing steps a) and b),
  ii. the apparatus securely saving the mixer number and the hash obtained in step b),
  iii. creating a modified copy of the second dataset using the mixer number and the mixing function,
  iv. hashing the modified copy using the hash function to form the third dataset, and
  v. implementing step c).

Advantageously, the method according to this fourth variant does not require the dataset to be kept securely.

Another subject of the invention is a computer-program product containing instructions readable by a processor of an apparatus for implementing the method according to the invention, according to any one of the variants defined above.

BRIEF DESCRIPTION OF THE DRAWINGS

The invention will possibly be better understood on reading the following detailed description of nonlimiting examples of implementation thereof, and on examining the appended drawings, in which:

FIG. 1 schematically shows the data and functions necessary to implement the invention according to its first or its second variant, FIG. 2 schematically illustrates an example of implementation of the invention according to its first variant, FIG. 3 schematically shows an example of implementation of the invention according to its second variant, FIG. 4 schematically illustrates the data and functions used to implement the invention according to its third variant, FIG. 5 schematically shows an example of implementation of the invention according to its third variant, FIG. 6 illustrates a scheme of implementation of the invention according to its fourth variant, FIG. 7 schematically illustrates the data used to implement the example of FIG. 8, FIG. 8 shows a first example of implementation of the invention applied to the verification of software packages, FIG. 9 shows a second example of implementation of the invention applied to the verification of software packages, FIG. 10 schematically illustrates devices and data used to implement the example of FIG. 11, FIG. 11 illustrates an example of implementation of the invention applied to increasing the security of Internet browsers, FIG. 12 schematically shows devices and data used to implement the example of FIG. 13, FIG. 13 shows an example of implementation of the invention applied to increasing the security of emails, and FIGS. 14A and 14B depict examples of a quantum communication system in which a shared quantum key generation method according to the invention is carried out.

DETAILED DESCRIPTION

FIG. 1 schematically shows data and functions used to implement the invention according to its first or its second variant, in which a message 101 must be sent by a device A to a device B via a data transmission channel 109, which channel may be secure or unsecure.

The device A may be a personal computer or a smartphone, and the device B an email server, the message 101 for example being an email sent by the computer or the phone via the Internet.

The device A may also be a server sending an email or a webpage, the device B then being a personal computer or a smartphone receiving said email or web page.

The device A may even be a measuring apparatus, for example for measuring the consumption of electricity, of gas or of water, or for measuring the wear of a part in a machine, the message 101 then being the result of such a measurement, and the device B a server that gathers the measurements and communicates with the measuring apparatus via a telecommunications network, for example an Internet of things, a Wi-Fi network or an LTE network.

The devices A and B may also be personal computers or smartphones.

The device A may be a web browser, the device B a web server and the message 101 a form filled in by the user of the browser A, the reception of the message not needing to be differentiated with respect to its transmission.

The devices A and B may each be equipped with a processor for executing the steps of the method according to the invention, and with a memory for saving the data required for this execution.

The device B has available to it encryption/decryption data 102B, such as a private key. The device A has available to it encryption/decryption data 102A, such as the public key associated with the private key 102B.

The device A also has available to it encryption/decryption data 103A, such as a private key associated with a public key 103B present in the device B.

The devices A and B possess random-number generators 104A and 104B, respectively, a common mixing function 105 and a common hash function 106.

The devices A and B also have encrypting functions 107A and 107B, respectively, and decrypting functions 108A and 108B, respectively.

FIG. 2 illustrates an example of implementation of the method according to the first variant of the invention.

In step 201, a first number, used to identify the message 101, is generated by the device A.

It may optionally be generated using the random-number generator 104A.

In step 202, the first number is added to the message 101. This addition may be a concatenation in any order defined by the communication protocol used between the two devices.

In step 203, the device A sends the data resulting from step 202 to the device B via the data transmission channel 109.

In step 204, on reception of the data, the device B randomly generates a second number using the random-number generator 104B.

In step 205, the device B makes use of the mixing function 105 to mix the second number with the message 101. By way of example, this mixing function is an XOR operating between the bits of the second number and the same number of bits of the message 101. The mixing function 105 is known by the device A.

In step 206, the device B uses the hash function 106 to hash the data obtained in the preceding step. The device B also uses the public encryption key 103B and the encrypting function 107B, to encrypt the second number.

In step 207, the device B sends to the device A via the channel 109 the first number and the encrypted second number.

In step 208, on reception of the two numbers, the device A decrypts the second number using the private encryption key 103A associated with the public key 103B that was necessarily used for the encryption, and the decryption function 108A associated with the encryption function 107B. If the second number was not encrypted by the device B, its decryption will be erroneous.

With the first number, the device A is able to identify the message 101, and to mix, using the mixing function 105, the decrypted second number with the identified message 101.

In step 209, the device A uses the hash function 106 to hash the data resulting from the preceding step.

In step 210, the device A uses the private encryption key 103A and the encrypting function 107A to encrypt the hash obtained in the preceding step.

In step 211, the device A sends the encrypted hash to the device B via the channel 109.

In step 212, on reception of the encrypted hash, the device B decrypts it using the public encryption key 103B associated with the private key 103A that was necessarily used for the encryption, and the decrypting function 108B associated with the encrypting function 107A.

In step 213, the device B compares the decrypted hash obtained in step 212 with the hash computed in step 206. If the two hashes are identical, the device B concludes that the message 101 has not been altered.

Preferably, the second number used in the mixing must be kept secret until the hashes have been compared to carry out the verification, but this mixer number may be revealed before, if it is possible to trust the devices that compute the hashes so that the data are not modified between the moment at which the mixer number is revealed and the comparison of the hashes.

FIG. 3 illustrates a second example of implementation of the method according to the second variant of the invention, the message 101 needing to be sent by the device A to the device B. The devices A and B may be personal computers or smartphones, and the message 101 may be an email.

The devices A and B may be neighboring automobiles, the exchanged data then being information relating to their movements, and the connection being achieved via a data link between the two vehicles, for example a 5G link, a Low-Energy Bluetooth link, an ultrahigh frequency RFID link, a Lora link or a Sigfox link.

In step 301, a random number is generated by the device A, using the random number generator 104A.

In step 302, the device A mixes the message 101 with the random number using the mixing function 105.

In step 303, the device A hashes the mixed data resulting from the preceding step, using the hash function 106.

In step 304, the device A encrypts the hash obtained in the preceding step using the encrypting function 107A and the private encryption key 103A.

In step 305, the device A encrypts the random number using the encrypting function 107A and the public encryption key 102A.

In step 306, the message 101, the encrypted random number and the encrypted hash are sent to the device B via the transmission channel 109, using the communication protocol agreed between the two devices.

In step 307, on reception of the data, the device B uses the decrypting function 108B and the public encryption key 103B to decrypt the hash, and the private encryption key 102B to decrypt the random number.

The device B is thus able to authenticate the device A.

In step 308, the device B mixes the message 101 with the random number, using the mixing function 105.

In step 309, the device B hashes the mixed data resulting from the preceding step, using the hash function 106.

In step 310, the device B compares the hash that it computed with the decrypted hash, and makes a conclusion as regards the integrity of the message 101.

In this example, the device B may forward the data received from device A to a third device. The device B decrypts, using the private key 102B the random number that it received from the device A before encrypting it again using the public key of the third device. The device B then transmits, to the third device, the encrypted random number and the hash encrypted by the device A. The third device, which has available to it the public key of the device A, will be able to verify that this hash indeed came from the device A, insofar as the device B did not modify the hash encrypted by the device A. A given dataset may therefore be verified as authentic by many users. This option however exposes the security of the certification, a fraudulent device being able to decrypt the random number, and potentially modify the message so that it has the same random hash as the initial hash. This implementation is therefore preferably used to certify the communication between computer systems formed from elements protected against such a fraudulent use.

FIG. 4 schematically illustrates the data and functions required to implement the invention according to its third variant, to verify that a file 401A present on a device A is identical to a file 401B present on a device B.

The devices A and B communicate via a transmission channel 409 that is for example a Wi-Fi network.

The device A possesses a random-number generator 404.

The devices A and B have in common a mixing function 405, a hash function 406 and a symmetric encryption key 410.

The device B has available to it an encrypting function 407.

The device A has available to it a decrypting function 408.

FIG. 5 illustrates a third example of implementation of the method according to the third variant of the invention.

In step 501, a random number is generated in device A using the random-number generator 404.

In step 502, a modified copy of the file 401A is created using the mixing function 405 and the random number.

In step 503, the modified copy of the file 401A is hashed using the hash function 406.

In step 504, the random number is encrypted using a symmetric encrypting algorithm and the symmetric encryption key 410, and is sent to the device B via the transmission channel 409.

In step 505, on reception of the encrypted random number, the device B decrypts it and uses it in a mixing function 405 to create a modified copy of the file 401B. By decrypting the random number, the device B can verify the identity of the device A.

In step 506, the modified copy of the file 401B is hashed with the same hash function 406.

In step 507, the hash of the modified copy is encrypted using the encrypting function 407 and the encryption key 410.

In step 508, the encrypted hash is sent to the device A.

In step 509, on reception of the encrypted hash, the device A decrypts it using the decrypting function 408 and the key 410.

In step 510, the device A compares the decrypted hash to the hash that it calculated in step 503, and thus is able to verify whether the two files 401A and 401B are identical.

FIG. 6 illustrates a fourth example of implementation of the method according to the fourth variant of the invention, for verifying that a file has not been modified between two times d1 and d2, while keeping completely secure between the two times a smaller dataset, this set comprising a number that is kept intact and secret and a hash that is kept intact and preferably secret.

In step 601, a random number is generated.

In step 602, at the time d1, a modified copy of the file is created using the generated random number and a mixing function, this function for example consisting in adding the random number to the end of the file.

In step 603, a hash of the modified copy is created, for example using the SHA2 function.

In step 604, the random number and the hash are stored securely and secretly, so that they cannot be modified and such that the random number is not disclosed to a third party.

In step 605, at the time d2, the person or the device having access to the information stored in step 604 desires to compare the file at the time d2 with the file used in steps 601 to 604. To do this, the saved random number is used to create a second modified copy of the file at the time d2, using the same mixing function as in step 602.

In step 606, a hash of the second modified copy is created using the same hash function as in step 603.

In step 607, the hash created in the preceding step is compared with the stored hash in order to ensure that the file has not been modified between the times d1 and d2.

FIG. 7 schematically illustrates the keys necessary to implement a fifth example, shown in FIG. 8, of the method according to the invention applied to the verification of software packages.

In the rest of the description, the operation of mixing a datum with a random mixer number followed by the hashing operation will be referred to as "random hashing" of this datum.

The example shown in the FIG. 8 is implemented between two devices: a device A called the software distributor and a device B called the client device.

Device A possesses two keys 701 and 702.

701 is a key serving to encrypt a hash, and is preferably private.

702 is a key serving to encrypt a random number, and is preferably public.

The device B possesses two keys 703 and 704.

703 is a key used to decrypt a hash encrypted using the key 701, and is preferably public.

704 is a key that is used to decrypt a random number encrypted using the key 702, and is preferably private.

The pair of keys (701, 703) is what may be called the pair of keys of the software distributor, the latter being able to use it to communicate with all the apparatuses on which one of the software packages that it distributes is installed.

The pair of keys (704, 702) is what may be called the pair of keys of the client, the latter being able to use it for all the software packages that it verifies during their download.

In step 801, the software distributor A carries out a random hashing of a software package to be transmitted to client B, in steps 301 to 305 described above with reference to FIG. 3.

The software distributor A uses the key 702 to encrypt the random number and the key 701 to encrypt the random hash of the software package.

In step 802, the software distributor A sends, to the client B, a dataset containing the software package, the encrypted hash of the software package and the encrypted random number, over a transmission line that may be secure or unsecure.

In step 803, on reception of the data set, the client B decrypts the hash with the key 703 and the random number with the key 704. The client B then uses the random number to carry out the random hashing of the received software package.

In step 804, if the computed hash is identical to the received hash, the client B permits the execution of the received software package, or replaces the preceding version of the software package with the version that it has just received.

In step 805, for greater security, steps 803 and 804 are re-executed at pre-programmed time intervals in order to verify the authenticity of the software package FIG. 9 describes another possible implementation of the random hashing, for verifying that the software package in the process of being downloaded is permitted by a software package in the process of being executed on an apparatus.

In step 901, the apparatus uses the method illustrated in FIG. 2 to verify that a received software package originates from a reliable source.

In step 902, steps 601 to 604 of FIG. 6 are executed to create, in the apparatus, a secure signature of the software package.

In step 903, before using the software package, steps 605 to 607 of FIG. 6 are executed to verify that the software package has not been modified since step 902.

FIG. 10 shows the objects necessary to implement the example illustrated in FIG. 11, allowing the security of data displayed by web browsers to be increased.

A web browser 1001 has available to it a pair of asymmetric keys that consist of a private key $1002p$ and a public key $1002u$.

A server $1003s$, which delivers to the browser the public keys of secure Internet sites $1004s$, possesses pair of asymmetric keys 1003 consisting of a private key $1003p$ and a public key $1003u$.

The Internet site $1004s$ possesses a pair of asymmetric keys 1004 consisting of a private key $1004p$ and a public key $1004u$.

It step 1101, a user enters, into the address bar of the browser 1001, the URL address of the site that he desires to consult.

In step 1102, the browser 1001 uses the pair of keys 1002 and sends, to the server $1003s$, the following information:
the URL address of the site that the user desires to consult,
the public key $1002u$ of the browser, and
the URL address of the browser 1001 so that the server can respond thereto.

In step 1103, the server $1003s$ uses the method according to the invention illustrated in FIG. 2 to securely send to the browser the public key $1004u$ of the site $1004s$.

The public key $1002u$ will be used by the server to decrypt the second number that the navigator sends thereto during the exchanges.

In step 1104, the browser 1001 sends to the site $1004s$ the following information:
the name of the page of the site that the user desires to consult,
the public key $1002u$ of the browser, and
the URL address of the browser so that the site can respond thereto.

In step 1105, the server $1004s$ uses the method according to the invention illustrated in FIG. 2 to send to the browser securely the requested page.

FIG. 12 shows the objects required to implement the example illustrated in FIG. 13, which allows the security of emails to be increased.

A first electronic device A, which may possibly be a computer or a smart phone, allows emails 1200 taking the form of electronic files to be sent, received, archived, edited and displayed.

This first device A has access to a pair of asymmetric keys $1201c$ consisting of a public key $1201u$ and a private key $1201p$.

A second electronic device B allows emails 1200 to be sent, received, archived, edited and displayed.

This second device B has access to a pair of asymmetric keys $1202c$ consisting of a public key $1202u$ and a private key $1202p$.

A server 1203 gathers the identification numbers and the public keys of electronic devices, such as A and B, certified to preserve the integrity of received emails and the confidentiality of the random numbers associated with the random hashing method according to the invention.

The server 1203 has access to a pair of keys $1203c$ consisting of a public key $1203u$ and of a private key $1203p$. It will be noted that this server may have a plurality of pairs of keys, each pair dedicated to the communication with one clearly defined electronic device.

A server 1204 associates the one or more electronic devices with the destination address 1205 of the email.

The server 1204 has access to a pair of keys $1204c$ consisting of a public key $1204u$ and of a private key $1204p$. It will be noted that this server may have a plurality of pairs of keys, each dedicated to communication with one clearly defined electronic device.

In step 1301, a user requests that the first device A send the email 1200 to the destination address 1205.

In step 1302, the first device A communicates with the server 1204, the public key of which it knows, using the method according to the invention illustrated in FIG. 2, in order to determine the identifier and the public key of the device B associated with the address 1205. After authentication of the first device A by the server 1204, the latter sends to the first device A the identifier and the public key of the device B. This is also done using the method illustrated in FIG. 2, the server 1204 knowing the public key of the device A and the latter knowing the public key of the server 1204. This method allows the device A to receive, from the server 1204, unmodified data. The server 1204 will itself have been able to obtain the public key of the device B from the server 1203 and, at the same time, to verify the public key of the device A.

In step 1303, the first device A communicates its identifier to the device B.

In step 1304, the device B, having received the identifier communicated in step 1303, communicates with the server 1203 in order to determine the public key of the first device A. This information is sent thereto using the method of FIG. 2, which allows the device B to receive unmodified information. The device B informs the device A of the reception of this information by sending thereto a reception acknowledgement.

In step 1305, on reception of the reception acknowledgement sent in step 1304, the first device A uses the method according to the invention illustrated in FIG. 2 to send the email 1200 to the device B, which may then be certain that this information was sent by the device A and has been received unaltered. In addition, the device A is certain to have certified this information only with the device B.

Since encrypting methods employing asymmetric keys and symmetric keys may be vulnerable to quantum computers, these encrypting methods may be replaced, in the examples described above, with encrypting methods using single-use keys.

FIGS. 14A and 14B schematically represent a quantum communication system 10 in which a shared quantum key generation method according to the invention is carried out. The system 10 comprises:
- an emitter 1 of entangled photons, configured to generate at least one pair of entangled photons comprising a first photon emitted on a first propagation path and simultaneously a second photon emitted on a second propagation path different from the first propagation path;
- a first receiver 2 arranged on the first propagation path, comprising a first polarization measurement base 4 configured to measure a polarization state of a photon received by the first receiver; and
- a second receiver 3 arranged on the second propagation path, comprising a second polarization measurement base 5 configured to measure a polarization state of a photon received by the second receiver.

The clocks of the two receivers are synchronized so that two photons of a same photon pair arriving at the receivers arrive at the same time according to the clocks of the reached receivers.

As can be seen in the example of FIG. 14A, the polarization measurement bases 4 and 5 are perpendicular to each other, and the pair of photons received is formed by two photons polarized in orthogonal directions 6 and 7. Therefore, the polarization direction 6, 7 of each photon received by the receiver 2 or 3 is perpendicular to the corresponding base 4 or 5.

Of course, the embodiment of FIG. 14A is a mere example and the polarization directions of the entangled photons as well as the directions of the polarization measurement bases can be other than perpendicular. For instance, the detected polarizations of the photons can be circular.

The polarization measurement bases 4 and 5 can be rotated randomly and simultaneously by a same angle $\Theta$ kept secret between the two receivers 2 and 3, as can be seen in the example FIG. 14B. The polarization directions 6, 7 of the photons received are assumed here not to have been changed from those of FIG. 14A.

Either one of the receivers 2, 3 may generate a sequence of random bits for determining the value of the angle $\Theta$ and sends said sequence to the other receiver in an encrypted manner. Alternatively, the angle $\Theta$ may be determined by a random code generated by the Quantum Key Distribution protocol described here, where for instance the first 5 bits of any generated random number may be used to determine the angle $\Theta$ used for the rotation of the bases used for the generation of the following shared random number.

The first receiver 2 establishes a first list comprising the reception dates and a second list comprising these reception dates and the polarization states of the photons it received, and the second receiver 3 establishes a third list comprising the reception dates and a fourth list comprising these reception dates and the complementary polarization states of the photons it received.

The first list and/or the third list are exchanged between the first receiver 2 and the second receiver 3 and are preferably signed electronically.

Upon reception of the third and/or first lists, respectively, the first receiver 2 and/or the second receiver 3 establish(es) a fifth list comprising the dates at which the two photons of the same pairs were received at both receivers, as some photons may have been lost during the transmission between the emitter and one or the two receivers.

If only one of the two receivers establishes the fifth list, the said fifth list is transmitted, preferably electronically signed, to the other receiver, so that the first receiver and the second receiver establish respectively a sixth list and a seventh list of polarization states of the photons as received by the first receiver, the sixth list being derived from the second list and the fifth list, the seventh list being derived from the fourth list and the fifth list, each polarization state on the sixth list of a photon received at a time marked on the fifth list being the same polarization state of the corresponding photon received at the same time and marked on the second list, each polarization state on the seventh list of a photon received at a time marked on the fifth list being the complementary polarization state of the corresponding photon received at the same time and marked on the fourth list.

Then, respective signatures of the sixth list and the seventh list are exchanged between the first and the second receivers according to the method corresponding to the third variant of the invention, the first receiver 2 being the first apparatus, the sixth list being the first dataset, the second receiver 3 being the second apparatus and the seventh list being the second dataset.

Indeed, the comparison of the hashes of said lists should give identical hashes to ensure that no list has been altered by a man in the middle attack, and that no photon has been lost in the transmission channel.

After such signatures have been received and verified, a signed message can be exchanged between the two receivers and the said sixth and seventh lists can be used as a shared list of random bits from which one-time keys or lists of random rotation angles of the polarization measurement bases, for instance, can be extracted.

The invention is not limited to the examples of embodiments described above, nor to the exemplified applications. The invention may in particular be used to increase the security of financial transactions.

The invention claimed is:

1. A method for verifying with an apparatus an integrity of a message originating from a sender, the method comprising:
   i. the apparatus receiving the message and an identifier of the message, said message forming a first dataset,
   ii. generating a mixer number, wherein the mixer number is generated using a pseudorandom number generator or based on at least one input value, wherein the at least one input value comprises a physical quantity varying continuously, wherein the mixer number comprises a single-use number, wherein the single-use number is renewed after each use,
   iii. mixing the mixer number with the first dataset using a mixing function, in order to obtain a mixed data,
   iv. hashing the mixed data using a hash function to obtain a first hash,
   v. encrypting the mixer number to obtain an encrypted mixer number, vi. the apparatus sending the identifier of the message and the encrypted mixer number to the sender of the message,
vii. the apparatus receiving an encrypted second dataset, originating from the sender,
viii. decrypting the encrypted second dataset with an encryption key kept secret between the apparatus and the sender to obtain a decrypted second dataset, wherein the decrypting the encrypted second dataset occurs during a time-out period,
ix. comparing the first hash obtained in step iv with the decrypted second dataset obtained in step viii, the integrity of the message being ensured when the decrypted second dataset obtained in step viii and the first hash obtained in step iv are identical, and
x. in response to a first number of unsuccessful verification attempts, placing the message in a queue.

2. A method for verifying with an apparatus an integrity of a message forming a first dataset originating from a sender, the method comprising:
   i. the apparatus receiving the message, an encrypted second dataset and an encrypted number, wherein the encrypted number comprises a mixer number, wherein the mixer number is generated using a pseudorandom number generator or based on at least one input value, wherein the at least one input value comprises a physical quantity varying continuously, wherein the mixer number comprises a single-use number, wherein the single-use number is renewed after each use,
   ii. decrypting the encrypted second dataset and the encrypted number with an encryption key kept secret between the apparatus and the sender to obtain a decrypted second dataset and the mixer number, wherein the decrypting the encrypted second dataset occurs during a time-out period,
   iii. mixing the message with the mixer number, using a mixing function, in order to obtain a mixed data,
   iv. hashing the mixed data using a hash function to obtain a first hash,
   v. comparing the first hash obtained in step iv with the decrypted second dataset obtained in step ii, the integrity of the message being ensured when the first hash obtained in step iv and the decrypted second dataset obtained in step ii are identical, and
   vi. in response to a first number of unsuccessful verification attempts, placing the message in a queue.

3. The method according to claim 2, comprising, before step i:
   the sender generating the mixer number,
   mixing the mixer number with the message, using the mixing function,
   hashing a data resulting from mixing the mixer number with the message using the hash function,
   encrypting with the encryption key a second hash resulting from hashing the data and forming a second dataset,
   encrypting the mixer number to obtain an encrypted mixer number, and
   sending to the apparatus the message, the encrypted second dataset and the encrypted mixer number.

4. A method, implemented by a first apparatus and a second apparatus, for comparing a first dataset present in the first apparatus and a second dataset present in the second apparatus, the method comprising:
   i. the first apparatus mixing a mixer number, with the first dataset, using a mixing function, in order to obtain a mixed data, wherein the mixer number is generated using a pseudorandom number generator or based on at least one input value, wherein the at least one input value comprises a physical quantity varying continuously, wherein the mixer number comprises a single-use number, wherein the single-use number is renewed after each use,
   ii. the first apparatus hashing the mixed data using a hash function to obtain a first hash,
   iii. the first apparatus encrypting the mixer number to obtain an encrypted mixer number,
   iv. the first apparatus sending, to the second apparatus, the encrypted mixer number,
   v. the first apparatus receiving a second mixed data, wherein the second mixed data comprises the second dataset mixed with the mixer number,
   vi. the first apparatus decrypting the second mixed data with an encryption key kept secret between the first apparatus and the second apparatus to obtain a decrypted second mixed data, wherein the decrypting the second mixed data occurs during a time-out period,
   vii. comparing the first hash obtained in step ii with the decrypted second mixed data obtained in step vi, the mixer number being a renewable key, renewed after each use, and
   viii. in response to a first number of unsuccessful verification attempts, placing the first dataset and the second dataset in a queue.

5. The method according to claim 4, comprising, between steps iv and v:
   the second apparatus receiving the encrypted mixer number,
   decrypting the mixer number to obtain a decrypted mixer number,
   creating a modified copy of the second dataset using the mixer number and the mixing function,
   hashing the modified copy of the second dataset using the hash function to obtain a second hash,
   encrypting the second hash resulting from hashing the modified copy of the second dataset with the encryption key to obtain an encrypted second hash, and
   the second apparatus sending to the first apparatus the encrypted second hash of the second dataset.

6. A shared quantum key generation method using a quantum communication system, the quantum communication system comprising:
   an emitter of entangled photons, configured to generate at least one pair of entangled photons comprising a first photon emitted on a first propagation path and simultaneously a second photon emitted on a second propagation path different from the first propagation path;
   a first receiver arranged on the first propagation path, comprising a first polarization measurement base configured to measure a first polarization state of the first photon received by the first receiver;
   a second receiver arranged on the second propagation path, comprising a second polarization measurement base configured to measure a second polarization state of the second photon received by the second receiver, clocks of the first receiver and the second receiver being synchronized so that the first photon and the second photon are received sequentially according to the clocks of the first receiver and the second receiver;
   wherein the first receiver establishes a first list comprising first reception dates and a second list comprising the first reception dates and first polarization states of first photons received by the first receiver, and the second receiver establishes a third list comprising second reception dates and a fourth list comprising the second reception dates and second polarization states of second photons received by the second receiver;

wherein the first list or the third list is sent to the second receiver or the first receiver respectively, wherein the first list or the third list is sent with a third dataset comprising an encrypted hash of a third mixed data, wherein the third mixed data comprises the first list or the third list mixed with a second mixer number, wherein the second mixer number is randomly generated;

wherein upon reception of the first list or the third list, respectively, the first receiver or the second receiver establishes a fifth list comprising the first reception dates and the second reception dates at which the first photon and the second photon were received at both the first receiver and the second receiver, as some photons may have been lost during transmission between the emitter and the first receiver or the second receiver;

wherein when the first receiver or the second receiver-establishes the fifth list, the fifth list is transmitted, preferably electronically signed, to the second receiver or the first receiver respectively, so that the first receiver or the second receiver establish, respectively, a sixth list and a seventh list of polarization states of the first photons as received by the first receiver and the second photons as received by the second receiver, the sixth list being derived from the second list and the fifth list, the seventh list being derived from the fourth list and the fifth list, each polarization state on the sixth list of third photons received at a first time marked on the fifth list being a same polarization state of at least one first corresponding photon received simultaneously and marked on the second list, each polarization state on the seventh list of fourth photons received at the first time marked on the fifth list being a complementary polarization state of at least one second corresponding photon received simultaneously and marked on the fourth list;

wherein respective signatures of the sixth list and the seventh list are exchanged between the first receiver and the second receiver according to the method of claim 5, the first receiver being the first apparatus, the sixth list being the first dataset, the second receiver being the second apparatus and the seventh list being the second dataset;

wherein the sixth list and the seventh list can be used as a shared list of random bits.

7. The method according to claim 6, wherein a signed message is exchanged between the first receiver and the second receiver before the sixth list and the seventh list are used as one-time keys.

8. The method according to claim 7, wherein the first receiver or the second receiver generates a sequence of random bits for determining a value of an angle and sends said sequence to the second receiver or the first receiver, respectively, in an encrypted manner.

9. The method according to claim 6, wherein the first polarization measurement base and the second polarization measurement base are rotated randomly and simultaneously by a same angle kept secret between the first receiver and the second receiver.

10. The method according to claim 9, wherein the sixth list and the seventh list are used as lists of random rotation angles of the first polarization measurement base and the second polarization measurement base.

11. The method according to claim 4, the mixing function being an XOR logic function.

12. The method according to claim 4, the mixing function being a suffix function, consisting in adding the mixer number to an end of the first dataset.

13. The method according to claim 4, the mixing function being an encryption function using the mixer number as a second encryption key to encrypt the first dataset.

14. The method according to claim 13, the encryption function being an XOR function.

15. The method according to claim 4, the mixing function being a combination of an XOR function, a suffix function consisting in adding the mixer number to an end of the first dataset and an encryption function using the mixer number as a second encryption key to encrypt the first dataset.

16. The method according to claim 4, the decrypting being performed with a non-renewable key of a size of the second dataset.

17. The method according to claim 4, the decrypting being performed with another renewable key of a size of the second dataset.

18. The method according to claim 4, the decrypting being performed with a non-renewed symmetric key and a symmetric encryption function.

19. The method according to claim 4, a non-renewed asymmetric key and an asymmetric encryption function being used for the decrypting.

* * * * *